US009789864B2

(12) United States Patent
Wein et al.

(10) Patent No.: US 9,789,864 B2
(45) Date of Patent: Oct. 17, 2017

(54) DEVICES AND METHODS FOR DISTRIBUTING AN OVERALL TARGET TORQUE SPECIFICATION

(71) Applicant: AUDI AG, Ingolstadt (DE)

(72) Inventors: Michael Wein, Seubersdorf (DE); Clemens Burow, München (DE); Stefan Beyer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 1 day.

(21) Appl. No.: 15/100,133

(22) PCT Filed: Nov. 11, 2014

(86) PCT No.: PCT/EP2014/003018
§ 371 (c)(1),
(2) Date: May 27, 2016

(87) PCT Pub. No.: WO2015/078557
PCT Pub. Date: Jun. 4, 2015

(65) Prior Publication Data
US 2017/0267228 A1    Sep. 21, 2017

(30) Foreign Application Priority Data
Nov. 28, 2013    (DE) .................. 10 2013 019 902

(51) Int. Cl.
*B60W 20/15*    (2016.01)
*B60K 6/48*    (2007.10)
(Continued)

(52) U.S. Cl.
CPC .............. *B60W 20/15* (2016.01); *B60K 6/48* (2013.01); *B60K 6/52* (2013.01); *B60W 30/188* (2013.01);
(Continued)

(58) Field of Classification Search
CPC ....... B60W 20/15; B60W 30/188; B60K 6/48; B60K 6/52
See application file for complete search history.

(56) References Cited

U.S. PATENT DOCUMENTS 8,565,973 B2    10/2013    Wein
8,731,759 B2    5/2014    Wein et al.
(Continued)

FOREIGN PATENT DOCUMENTS

DE    10 2004 049 324 A1    4/2006
DE    10 2005 026 874 A1    12/2006
(Continued)

OTHER PUBLICATIONS

English International Search Report issued by the European Patent Office in International Application PCT/EP2014/003018.

*Primary Examiner* — Basil T Jos
(74) *Attorney, Agent, or Firm* — Henry M. Feiereisen LLC

(57) ABSTRACT

A hybrid manager control unit for a drive train of a vehicle, wherein the hybrid manager control unit has a total target torque dividing device for optimizing an efficiency by dividing a total target torque specification into a first axle torque specification for a first axle of the vehicle and a second axle torque specification for a second axle of the vehicle. The hybrid manager control unit has a redistributing device for producing a first and a second redistributed axle torque specification by partially or completely redistributing the first or the second axle torque specification to the second redistributed axle torque specification or to the first redistributed axle torque specification while taking into account at least one driving dynamics parameter. A vehicle includes a hybrid manager control unit for a drive train of a motor vehicle and a method for distributing a total target torque specification for a vehicle.

8 Claims, 3 Drawing Sheets

(51) Int. Cl.
*B60K 6/52* (2007.10)
*B60W 30/188* (2012.01)

(52) U.S. Cl.
CPC . *B60W 2540/10* (2013.01); *B60W 2710/0666* (2013.01); *B60W 2710/083* (2013.01); *B60W 2720/403* (2013.01); *B60Y 2200/92* (2013.01)

(56) References Cited

U.S. PATENT DOCUMENTS

| | | |
|---|---|---|
| 8,738,266 B2 | 5/2014 | Kruse et al. |
| 2005/0060079 A1 | 3/2005 | Phillips et al. |
| 2006/0076915 A1 | 4/2006 | Kaltenbach et al. |
| 2009/0108671 A1 | 4/2009 | Maeda et al. |
| 2011/0276207 A1 | 11/2011 | Falkenstein |
| 2013/0035818 A1* | 2/2013 | Meitinger ............ B60K 6/448 701/22 |

FOREIGN PATENT DOCUMENTS

| | | |
|---|---|---|
| DE | 10 2008 041 897 A1 | 3/2010 |
| DE | 10 2008 043 853 A1 | 5/2010 |
| DE | 10 2009 045 234 A1 | 4/2011 |
| DE | 10 2010 014 971 A1 | 10/2011 |
| DE | 10 2010 015 423 A1 | 10/2011 |
| DE | 10 2011 056 168 A1 | 6/2013 |
| DE | 10 2011 056 600 A1 | 6/2013 |

* cited by examiner

DEVICES AND METHODS FOR DISTRIBUTING AN OVERALL TARGET TORQUE SPECIFICATION

CROSS-REFERENCES TO RELATED APPLICATIONS

This application is the U.S. National Stage of International Application No. PCT/EP2014/003018, filed Nov. 11, 2014, which designated the United States and has been published as International Publication No. WO 2015/078557 and which claims the priority of German Patent Application, Serial No. 10 2013 019 902.6, filed Nov. 28, 2013, pursuant to 35 U.S.C. 119(a)-(d).

BACKGROUND OF THE INVENTION

The invention relates to a hybrid manager control unit for a drive train of a motor vehicle. The hybrid manager control unit has an overall target torque distribution device for optimizing an efficiency level by means of dividing an overall target torque specification into a first axle torque specification for a first axle of the motor vehicle and a second axle torque specification for a second axle of the motor vehicle. The hybrid manager control unit has a redistribution device for generating a first and a second redistributed axle torque specification by means of the partial or complete redistribution of the first or the second axle torque specification to the second redistributed axle torque specification or to the first redistributed axle torque specification. At least one driving dynamic parameter is taken into consideration.

One or more motors and/or generators can be connected to the first axle. For example, only an electric machine which can be operated either as a motor or as a generator or, alternatively, as a motor and as a generator may be connected to the first axle. Alternatively, only a combustion engine that can only be operated as a motor (drive machine) can be connected to the first axle. A further alternative provides that a plurality of electrical machines are connected to the first axle, each of which is selectively operable as a motor or as a generator. Alternatively or additionally, a plurality of combustion engines that can be operated as a motor can be connected to the first axle. Each of the respective drive and/or energy recovery variants for the second axle may be combined with each of the said drive and/or energy recovery variants of the first axle. If no additional axle for driving the motor vehicle is present, typically at least one drive machine is connected to the first or to the second axle. Moreover, it is also possible to use one or more combustion engines on the first and/or on the second axle for braking when needed. An operation in which the electric power that is generated by an electric machine is converted into heat in the electrical machine itself (for example, in a short circuit operation for braking) is here regarded as an energy recovery variant (though not for efficiency considerations). In a preferred embodiment, a combustion engine combined with at least one electric machine on the first axle is provided and at least one electric machine is provided on the second axle (preferably without a combustion engine). Combustion engine in the sense of the present invention may also be referred to as internal combustion engines or internal combustion motors.

Moreover, the invention relates to a vehicle control which includes such a hybrid manager control unit and a chassis control unit for providing a torque distribution target specification and/or for providing a specification for a maximum axle torque of the first axle and/or for providing a specification for a maximum axle torque of the second axle.

Moreover, the invention relates to a motor vehicle that includes such a hybrid manager control unit or such a vehicle control.

Furthermore, the invention also relates to a method for distributing an overall target torque specification for a motor vehicle:

The DE 10 2010 015 423 A1 describes a control device for an all-wheel drive motor vehicle. The control device is assigned a torque distribution unit with which a driving torque can be distributed to a front wheel drive and rear wheel drive. The controller determines an efficiency mode. However, when there are transverse dynamic influences, the electronic control device can control the drive device with an all-wheel drive mode.

The known control device has the disadvantage that the all-wheel control has a limiting effect on a servo control of the drive torque (and possibly braking torques) and thus affects the motor vehicle's longitudinal acceleration.

SUMMARY OF THE INVENTION

It is an object of the present invention to provide a vehicle control for a torque distribution in which an influence of the torque distribution on the motor vehicle longitudinal acceleration is avoided or at least reduced. In addition, it is an object of the invention to define a hybrid manager control unit suitable for it and a corresponding method for distributing an overall target torque specification. Furthermore, it is an object of the invention to provide a motor vehicle with this advantage.

According to one aspect of the present invention, the object is attained by a hybrid manager control unit for a drive train of a motor vehicle, is with the hybrid manager control unit including an overall target torque distribution device for optimizing efficiency by means of dividing an overall target torque specification into a first axle torque specification for a first axle of the motor vehicle and into a second axle torque specification for a second axle of the motor vehicle. The hybrid manager control unit includes a redistribution device for generating a first and a second redistributed axle torque specification by means of the partial or complete redistribution of the first or the second axle torque specification to the second redistributed axle torque specification or to the first redistributed axle torque specification taking into account at least one driving dynamic parameter.

According to another aspect of the present invention, the object is attained by a vehicle control which includes a hybrid manager control unit as set forth above, and a chassis control unit for providing a torque distribution target specification and/or for providing a specification for a maximum axle torque of the first axle and/or for providing a specification for a maximum axle torque of the second axle.

According to another aspect of the present invention, the object is attained by a motor vehicle which includes a hybrid manager control unit as set forth above, or a vehicle control as set forth above.

According to another aspect of the present invention, the object is attained by a corresponding method for distributing an overall target torque specification for a motor vehicle, which method includes the following steps. In a first step of the method, an efficiency level is optimized by distributing an overall target torque specification into a first axle torque specification for a first axle of the motor vehicle and into a second axle torque specification for a second axle of the motor vehicle. In a second step of the method, a first and a second redistributed axle torque specification is generated by means of partial or complete redistribution of the first or the second axle torque specification to the other of the two axle torque specifications taking into account at least one driving dynamic parameter.

Advantageous further developments of the present invention are specified in the dependent claims.

A concept of the present invention can be seen where priority is granted to driving dynamic functions in driving dynamic critical operating states of the motor vehicle while priority is granted to efficiency optimization in driving dynamic uncritical operating states. An additional concept of the invention is that functions for the distribution of torques are clearly separated from functions for the limitation of torques. No consideration of a possibly unintended drive torque reduction needs to be taken in the design of distributed open and closed loop controllers. Feed-forward controller components can be designed so that these never limit. Limitations can be reserved for a subset of the functions regulated. The redistribution of target torque specifications can be done even with small torques based on a percentage value. Depending on the application situation, the redistribution can be set only as a constant remaining drive torque distribution. Servo controls act here directly without time delay through the exchange of efficient and driving dynamic target torques.

If required, the axle torques can be individually reduced by wheel controller. Thus, even then a desired driving behavior can be set if, for reasons of performance limitations of a drive axle, no further distribution of drive torques is possible. Example: The all-wheel-dynamics software distributes the overall target torque specification when cornering to the second axle (for example, rear axle) in order to improve driving behavior. But when the second axle is not so powerful that it can provide the required torque, it may be advantageous to avoid slowing down the motor vehicle in which a torque specification or a portion of the torque specification of an axle (for example, the front axle) is still not redistributed to the other axle (for example, rear axle).

As long as there are no driving dynamic reasons for a shift of drive torque between two drive axles, the most efficient (efficiency-optimized) drive torque distribution can be maintained. Nevertheless, a clear separation of drive control (efficiency) and driving dynamics control (driving safety) can be preserved. If the target torque changes, the distribution can remain preserved without time delay, since their percentage value is already present and the torque specifications need not be routed through the chassis control unit. If the torque of an axle is limited, this takes place via defined axle torque limiting interfaces at the end of the torque path in the hybrid manager control unit. The longitudinal motor vehicle acceleration can usually be maintained when both axles can transmit the requested overall target torque. Thus, the initially defined object of the present invention is fulfilled, that an influence of the torque distribution on the motor vehicle longitudinal acceleration is avoided or at least reduced.

It is particularly preferred if the hybrid manager control unit has a first axle torque limiter for limiting the first redistributed axle torque specification. Alternatively or additionally, it may also be advantageous when the hybrid manager control unit includes a second axle torque limiter for limiting the second redistributed axle torque specification. This can avoid an overload of the first and/or second axle.

It is advantageous when the hybrid manager control unit has a device for compensating a decrease of the first redistributed axle torque specification, which takes place by limiting the first redistributed axle torque specification. Alternatively or additionally, it may also be advantageous when the hybrid manager control unit has a device for compensating a reduction in the redistributed second axle torque specification, which takes place by limiting the second redistributed axle torque specification. In this way, when the axle torque limiter grips only one of the two axle torque limiters, an overall target torque specification can still be fulfilled despite the limitation in many cases.

It may also be appropriate if the hybrid manager control unit has an overall target torque specification determining device for determining an overall target torque specification. The recording of the determining function for the overall target torque specification in the control unit according to the invention can increase reliability of the vehicle control.

One embodiment provides that the overall target torque specification determining device is prepared to generate the overall target torque specification taking into account an accelerator activation. With this feature, the invention can be used in motor vehicles whose speed is controlled by a driver. The accelerator is commonly referred to as a gas pedal.

Preferred embodiments provide that the efficiency level is an energy efficiency level or a wear efficiency level or a combination of both efficiency levels. The economics of using the motor vehicle is increased by taking into account such an efficiency level.

It is preferred if the method after the step of generating a first and a second axle redistributed torque specification also includes at least one of the following two steps: Limiting the first redistributed axle torque specification; limiting the second redistributed axle torque specification. In this way, an overload of the first and/or second axles can be avoided.

BRIEF DESCRIPTION OF THE DRAWING

The present invention is now explained in more detail with reference to the accompanying drawings, which each represent one example. It is shown in.

DETAILED DESCRIPTION OF PREFERRED EMBODIMENTS

The embodiments described in more detail below represent preferred embodiments of the present invention.

Figure 1:
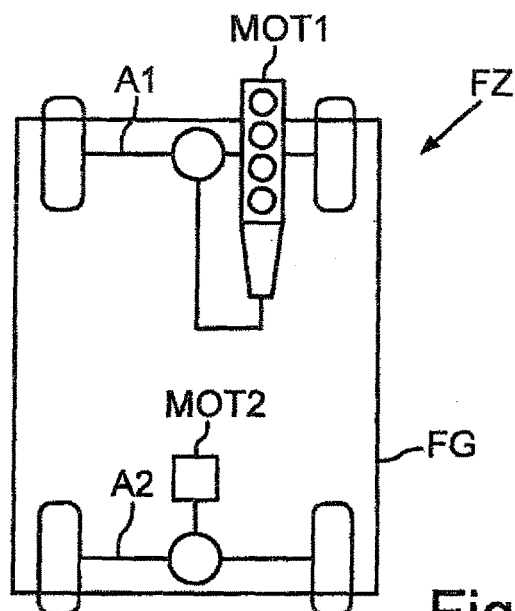
FIG. 1 schematically a motor vehicle with a front axle, which is driven by a combustion engine, and with a rear axle that is driven by an electric motor.

The motor vehicle FZ shown in FIG. 1 includes a first A1 and second A2 axle and two drives MOT1, MOT2. The two axles A1, A2 are suspended in a common chassis FG. A combustion engine MOTZ, for example, is provided for driving the first axle A1. An electric motor MOT2 is provided, for example, for driving the second axle A2. Such a drive may be referred to as 'hybrid drive'. No mechanical coupling, especially no (central) cardan shaft and no (central) difference gear is provided between the drive shaft of the first axle A1 and the second axle A2. Or at least an operation of the motor vehicle FZ with uncoupled central cardan shaft is possible.

Figure 2:
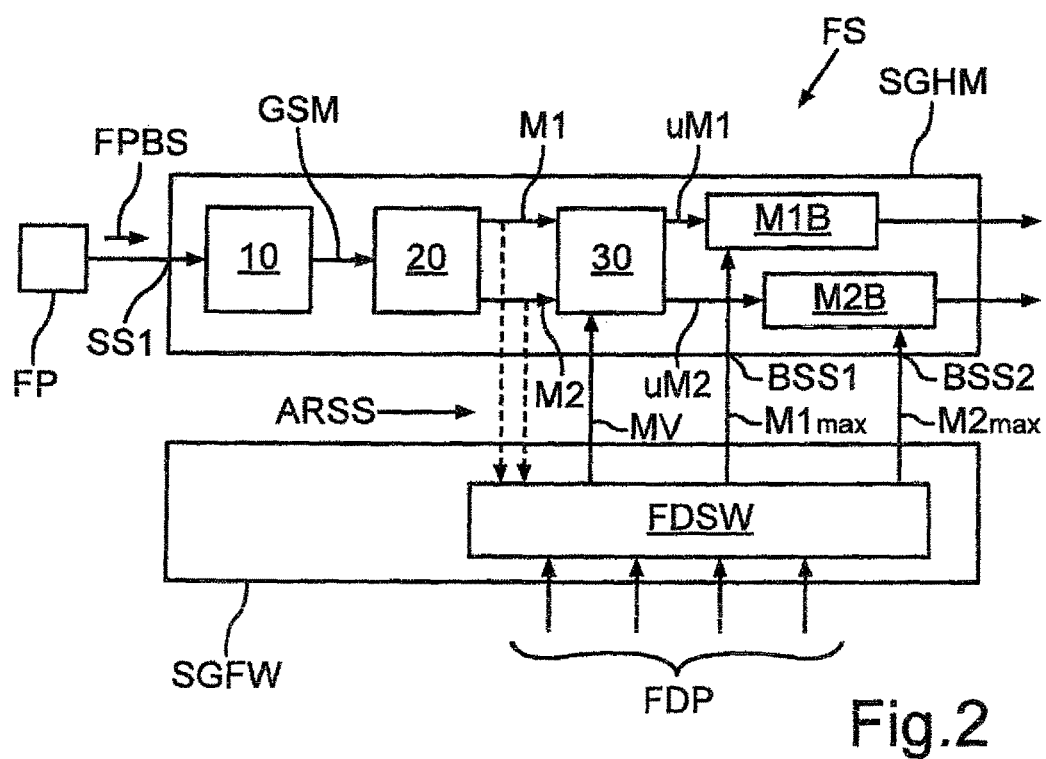
FIG. 2 schematically a block diagram of a vehicle control for generating and distributing an overall target torque specification for a motor vehicle.

The vehicle control FS shown in FIG. 2 includes a hybrid control unit manager SGHM, a chassis control unit SGFW and an all-wheel interface ARSS between the chassis control unit SGFW and the hybrid manager control unit SGHM. The hybrid manager control unit SGHM includes an overall target torque specification determining device 10, an overall target torque distribution device 20, a redistribution device 30, a first axle torque limiter M1B and a second axle torque limiter M2B. Control functions in the chassis control unit SGFW are typically realized by means of driving dynamics software (all-wheel motor vehicle dynamics software) FDSW. The hybrid manager control unit SGHM and the chassis control unit SGFW can be combined to form a common control unit.

The overall target torque specification determining device 10 determines an overall target torque specification GSM from an actuation signal of an accelerator FP. The actuation signal FPBS of the accelerator FP may be supplied to the hybrid manager control unit SGHM via a first interface SS1. There is an interface for transferring the overall target torque specification GSM to the overall target torque distribution device 20 between the overall target torque specification determining device 10 and the overall target torque distribution device 20.

The overall target torque distribution device 20 has an output for outputting a first axle torque specification M1 and an output for outputting a second axle torque specification M2. The two outputs are each connected to one input of the redistribution device 30.

The redistribution device 30 has an output for outputting a first redistributed axle torque specification uM1 and an output for outputting a second redistributed axle torque specification uM2.

The output for outputting the first redistributed axle torque specification uM1 is connected to an input of the first axle torque limiter M1B. The output for outputting the second redistributed axle torque specification uM2 is connected to an input of the second axle torque limiter M2B.

An output of the first axle torque limiter M1B is connected to an input of a (not shown in the figure) first actuator for setting a torque on the first axle A1 (for example, on the front axle). An output of the second axle torque limiter M2B is connected to an input of a (not shown in the figure) second actuator for setting a torque on the second axle A2 (for example, on the rear axle). The two actuators are typically engine control units. The engine control units can be combined with the hybrid manager control unit SGHM to a common unit.

The chassis control unit SGFW can specify following operating parameters to the hybrid manager control unit SGHM via the all-wheel interface ARSS, which can influence the distribution of an overall target torque specification in the GSM hybrid manager control unit SGHM:

The chassis control unit SGFW, taking into account the current driving dynamic state of the motor vehicle FZ by means of a torque distribution target specification MV, can specify how large a percentage MV=uM2/(uM1+uM2) the overall target torque specification GSM should be, which should be assigned to the second axle A2 (for example, rear axle) of the motor vehicle FZ.

In addition, the chassis control unit SGFW can specify an upper limit M1max for the torque on the first axle A1 (for example, front axle) of the motor vehicle FZ taking into account the current driving dynamic state of the motor vehicle FZ. Optionally, the corresponding can be provided (for example, for braking or recuperation operation) for a lower limit of a torque with a negative sign to the first axle A1 of the motor vehicle FZ.

In addition, the chassis control unit SGFW can specify an upper limit M2max for the torque on the second axle A2 (for example, rear axle) of the motor vehicle FZ taking into account the current driving dynamic state of the motor vehicle FZ. Optionally, the corresponding can be provided (for example, for braking or recuperation operation) for a lower limit of a torque with a negative sign to the second axle A2 of the motor vehicle FZ.

Optionally, the all-wheel interface ARSS also provides a transfer of the first M1 and/or the second M2 axle torque specification to the chassis control unit SGFW. The chassis control unit SGFW can then detect an arbitrary (real of unreal) subset of the aforementioned three operating parameters, taking into account the first M1 and/or the second axle torque M2 specification.

Figure 3:
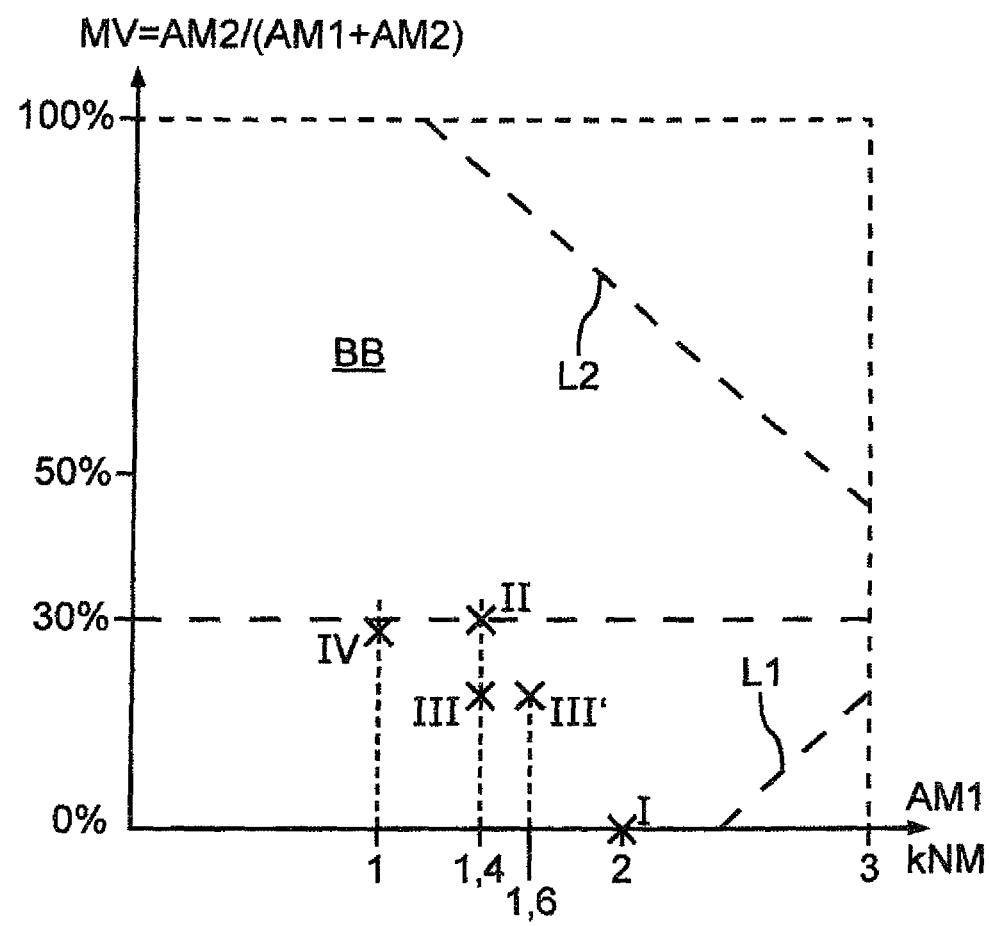
FIG. 3 an overview of possible pairings of torques on both motor vehicle axles; and overall target torque specification for a motor vehicle.

FIG. 3 gives an overview about a variability of the drive torque distribution of an all-wheel drive. The abscissa value here represents the driving torque AM1 which is applied to the first axle A1. The ordinate value describes the percentage AM2/(AM1+AM2) of the torque AM2 to the second axle A2 relative to the sum AM1+AM2 of the torques AM1, AM2 on the two axles A1, A2. The line L1 marks a limitation of the operating range BB due to a limited capacity of the first axle A1. The line L2 marks a limitation of the operating range BB due to a limited capacity of the second axle A2.

In the following, examples for driving dynamic operating states I, II, III, IV are considered. For each example, it is assumed that the overall target torque distribution device 20 assigns an overall target torque specification GSM for example, 2,000 Nm completely to the first axle A1 (for example, front axle).

In the first driving dynamic operating state I, a monitoring function in the chassis control unit SGFW comes to the conclusion that the driving state of the motor vehicle FZ appropriately lets no driving dynamic engagement appear. It therefore causes no redistribution of the already divided overall target torque specification GSM. The complete assignment of the overall target torque specification GSM of 2,000 Nm to the first axle A1 therefore remains unchanged. In the first driving dynamic mode, the monitoring function in the chassis control unit SGFW comes to the conclusion that the state of the motor vehicle FZ, from the driving dynamic point of view, also appropriately lets no limitation of one of the axle torques appear.

To achieve that the redistribution device 30 does not perform redistribution 130 of the first M1 and second M2 axle torque specification, it can be provided that the chassis control unit SGFW requests a target distribution MV of 0% in this case. In order to distinguish the case of the non-request of a redistribution 130 from the request of a complete avoidance of a torque on the second axle A2, a special signal can be reserved for the non-request of a redistribution 130 (in the sense of a data value which is designated with NULL, NIL or VOID in the data processing, for example).

In the second driving dynamic operating state II, a monitoring function in the chassis control unit SGFW comes to the conclusion that the driving state of the motor vehicle FZ appropriately lets a driving dynamic engagement appear. It therefore causes a redistribution 130 of the already divided overall target torque specification GSM, so that the division of the overall target torque specification GSM that was made by the overall target torque distribution device 20 is overwritten by the redistribution device 30 and the second axle is assigned 30% of the torque of the overall target torque specification GSM. Of the entire 2000 Nm, 1400 Nm are assigned to the first axle and 600 Nm to the second axle. In the second driving dynamic state, the monitoring function in the chassis control unit SGFW comes to the conclusion that the driving state of the motor vehicle FZ, from a driving dynamic point of view, appropriately lets no limitation of one of the axle torques appear.

In the third driving dynamic state III, a monitoring function in the chassis control unit SGFW comes to the conclusion that the driving state of the motor vehicle FZ appropriately lets a driving dynamic engagement appear. It therefore causes a redistribution 130 of the already divided overall target torque specification GSM, so that the division of the overall target torque specification GSM that was made by the overall target torque distribution device 20 is overwritten by the redistribution device 30 and the second axle is assigned 30% of the torque of the overall target torque specification GSM. Of the entire 2000 Nm, 1400 Nm are assigned to the first axle and 600 Nm to the second axle. In the third driving dynamic state, the monitoring function in the chassis control unit SGFW comes to the conclusion that the driving state of the motor vehicle FZ, from a driving dynamic point of view, appropriately lets a limitation of the axle torque of the second axle A2 (but not the first axle) appear. The axle torque to the second axle A2 is therefore, for example, limited to 400 Nm (see operating point which is designated in FIG. 3 with III).

Optionally, it can be provided that the difference (here 200 Nm) arising through the limitation of the axle torque is redistributed to the first axle A1, and as far as possible as this permits a limitation of the axle torque of the first axle A1 (see operating point that is referred to in FIG. 3).

In the fourth driving dynamic state IV, a monitoring function in the chassis control unit SGFW comes to the conclusion that the driving state of the motor vehicle FZ appropriately lets a driving dynamic engagement appear. It therefore causes a redistribution 130 of the already divided overall target torque specification GSM, so that the division of the overall target torque specification GSM that was made by the overall target torque distribution device 20 is overwritten by the redistribution device 30 and the second axle is assigned 30% of the torque of the overall target torque specification GSM. Of the entire 2000 Nm, 1400 Nm are assigned to the first axle and 600 Nm to the second axle. In the fourth driving dynamic state IV, the monitoring function in the chassis control unit SGFW comes to the conclusion that the driving state of the motor vehicle FZ, from a driving dynamic point of view, appropriately lets a limitation of the axle torque of both axles A1, A2 appear. The axle torque to the first axle A1, A2 is therefore limited, for example, to 1000 Nm and the second axle A2, for example, to 400 Nm. The difference arising by limiting the axle torque difference for the second axle A2 can not be distributed back to the first axle A1 here since the current limitation of the axle torque of the first axle A1 does not allow this (see the operating point, which is designated in FIG. 3 with IV).

Figure 4:
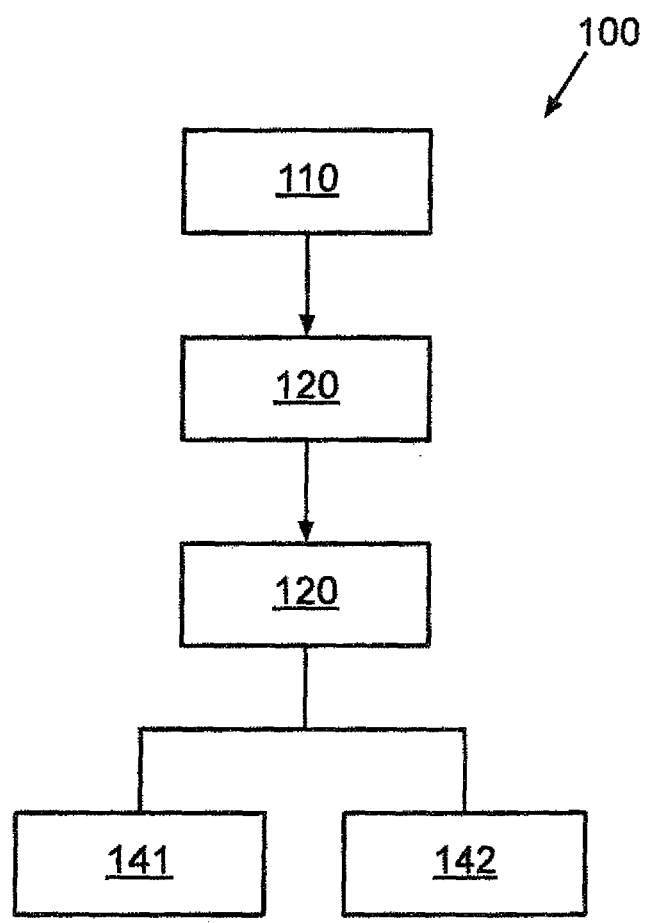
FIG. 4 schematically a flow chart of a method for the distribution of an overall target torque specification for a motor vehicle.

FIG. 4 shows a flowchart of a method 100 for distributing an overall target torque specification GSM for a motor vehicle FZ, wherein the method 100 includes the following steps. In a first step 110, an overall target torque specification determining device generates an overall target torque specification GSM taking into account an accelerator activation FPB. In a second step 120, an efficiency level is optimized by dividing 120 an overall target torque specification GSM into a first axle torque specification M1 for a first axle A1 of the motor vehicle FZ and into a second axle torque specification M2 for a second axle A2 of the motor vehicle FZ. In a third step 130, a first uM1 and a second uM2 redistributed axle torque specification is generated by means of partial or complete redistribution 130 of the first M1 and second M2 axle torque specification to the other of the two axle torque specifications. This is done taking into account at least one driving dynamic parameter FDP. In a fourth step 141, 142, the first redistributed axle torque specification uM1 is limited and/or the second redistributed axle torque specification uM2 is limited.

Embodiments of the present invention may have the following features.

The all-wheel interface ARSS initially provides a percentage assignment of the overall target torque specification GSM for both axles A1, A2 and subsequent limitation of individual axle torques AM1, AM2. To do this, a drive torque distribution desired from an efficiency point of view is calculated in the hybrid manager control unit. The determined two target torques for the two drive axles A1, A2 are notified of the chassis control SGFW (driving dynamics control).

The distribution control can be carried out on an overall target torque specification GSM, which is filtered for reasons of comfort. The distributed M1, M2 and/or redistributed uM1, uM2 torque specifications can be performed through driving behavior filtering in order to avoid too rapid torque build-up, which can lead to drive train vibrations. Driving comfort is thereby considerably enhanced.

The drive control can determine an optimal division of the overall target torque specification GSM to both drive axles A1, A2 as viewed from the operation strategy from a driver's desired torque GSM. The division A1, A2 of the overall target torque specification GSM can be communicated to the chassis control SGFW of the power train via the all-wheel interface ARSS.

If no driving dynamic intervention is performed, a percentage value for the desired drive torque AM2 to the second axle A2 can be returned to the engine control unit, which corresponds to a target torque specification M1 for the first axle A1. If no intervention is required for driving stability or driving safety, the percentage distribution MV=M2/(M1+M2) of the target torques M1, M2 need not be changed.

If a driving dynamic intervention is performed, a percentage shift in favor of one of the two drive axles A1, A2 can be done. For example, the percentage MV for the proportion of the drive torque AM2 to the second axle A2 can be selected so that a desired distribution AM2/(AM1+AM2) of drive torques AM1, AM2 is set. To do this, the percentage target proportion MV of the primary A1 or the secondary A2 drive axle can be communicated to the hybrid manager control unit SGHM.

If the hybrid manager control unit SGHM cannot implement the distribution request, if one of the drive axles A1, A2 cannot provide the desired drive torque uM1, uM2, a distribution AM2/(AM1+AM2) of drive torques uM1, uM2 is set, which operates the underperforming axle A1, A2 at its performance limit. Depending on the performance, a drive torque distribution AM2/(AM1+AM2) results, which takes into account as best as possible driving dynamic issues without unnecessarily reducing the drive torque of the other axle.

If this is not sufficient, the axle torque of the one drive axle, from which the drive torque is shifted away can be further reduced via the axle torque limiting interface BSS1, BSS2 in order to set a desired driving behavior.

The torque limit 141, 142 can be done to timely unfiltered actual torques. The inclusion of the limit can be carried out without driving behavior filtering to ensure rapid control and to quickly counteract the wheel slip if wheel slip occurs.

A quick slip limiting and/or taking account of power limitation of a drive axle A1, A2 is done according to a load-reversal damping. This ensures control at the required speed.

The torque distribution 120 and/or the torque redistribution 130 can be carried out after a load-reversal damping and before axle-selective load-reversal damping. The axle-selective load-reversal damping can be adjusted so that the filtering does not lead to a reaction on the overall torque AM1, AM2.

What is claimed is:

1. A hybrid manager control unit for a drive train of a motor vehicle, comprising:
    an overall target torque distribution device configured to optimize an efficiency level by dividing an overall target torque specification into a first axle torque specification for a first axle of the motor vehicle and into a second axle torque specification for a second axle of the motor vehicle;
    a redistribution device configured to generate first and second redistributed axle torque specifications by partial or complete redistribution of the first or the second axle torque specification to the first or the second redistributed axle torque specification, while taking into account at least one driving dynamic parameter; and
    a first axle torque limiter configured to limit the first redistributed axle torque specification after generating the first redistributed axle torque specification; and/or
    a second axle torque limiter configured to limit the second redistributed axle torque specification after generating the second redistributed axle torque specification.

2. The hybrid manager control unit of claim 1, further comprising a first device for compensating a decrease of the first redistributed axle torque specification by limiting the first redistributed axle torque specification; and/or a second device for compensating a reduction of the second redistributed axle torque specification by limiting the second redistributed axle torque specification.

3. The hybrid manager control unit of claim 1, further comprising an overall target torque specification determining device configured to determine an overall target torque specification.

4. The hybrid manager control unit of claim 3, wherein the overall target torque specification determining device is configured to generate the overall target torque specification by taking into account an accelerator activation.

5. The hybrid manager control unit of claim 1, wherein the efficiency level is an energy efficiency level or a wear efficiency level or a combination of both.

6. A vehicle control, comprising:
    a hybrid manager control unit for a drive train of a motor vehicle, said hybrid manager control unit comprising an overall target torque distribution device configured to optimize an efficiency level by dividing an overall target torque specification into a first axle torque specification for a first axle of the motor vehicle and into a second axle torque specification for a second axle of the motor vehicle, a redistribution device configured to generate first and second redistributed axle torque specifications by partial or complete redistribution of the first or the second axle torque specification to the first or the second redistributed axle torque specification, while taking into account at least one driving dynamic parameter; and a first axle torque limiter configured to limit the first redistributed axle torque specification after generating the first redistributed axle torque specification; and/or a second axle torque limiter configured to limit the second redistributed axle torque specification after generating the second redistributed axle torque specification; and
    a chassis control unit configured to provide a torque distribution target specification and/or to provide a specification for a maximum axle torque of the first axle and/or to provide a specification for a maximum axle torque of the second axle.

7. A motor vehicle, comprising:
    a hybrid manager control unit for a drive train of a motor vehicle, said hybrid manager control unit comprising an overall target torque distribution device configured to optimize an efficiency level by dividing an overall target torque specification into a first axle torque specification for a first axle of the motor vehicle and into a second axle torque specification for a second axle of the motor vehicle, a redistribution device configured to generate first and second redistributed axle torque specifications by partial or complete redistribution of the first or the second axle torque specification to the first or the second redistributed axle torque specification, while taking into account at least one driving dynamic parameter; and a first axle torque limiter configured to limit the first redistributed axle torque specification after generating the first redistributed axle torque specification; and/or a second axle torque limiter configured to limit the second redistributed axle torque specification after generating the second redistributed axle torque specification; or
    a vehicle control including the hybrid manager control unit and a chassis control unit configured to provide a torque distribution target specification and/or to provide a specification for a maximum axle torque of the first axle and/or to provide a specification for a maximum axle torque of the second axle.

8. A method for distributing an overall target torque specification for a motor vehicle, said method comprising the steps of:
    optimizing an efficiency level by dividing an overall target torque specification into a first axle torque specification for a first axle of the motor vehicle and into a second axle torque specification for a second axle of the motor vehicle;
    generating first and second redistributed axle torque specifications by partial or complete redistribution of the first or the second axle torque specification to the other of the two axle torque specifications, taking into account at least one driving dynamic parameter, and
    at least one of the following steps of limiting the first redistributed axle torque specification, or limiting the second redistributed axle torque specification.

* * * * *